April 4, 1944.   W. A. EATON   2,346,015
THROTTLE CONTROLLING MECHANISM
Filed Oct. 27, 1941
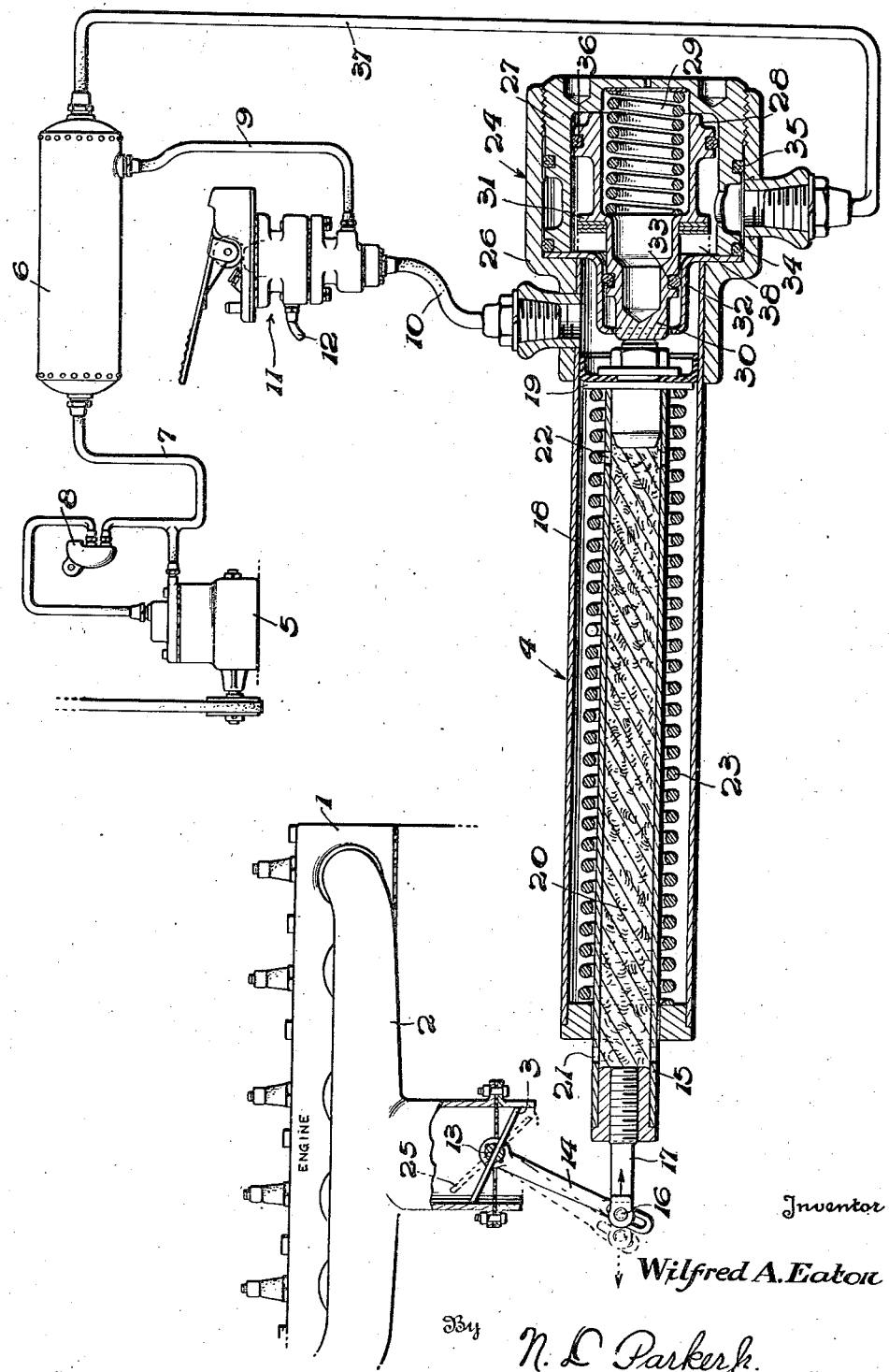
Inventor.
Wilfred A. Eaton
By N. L. Parker Jr.
Attorney Patented Apr. 4, 1944

2,346,015

UNITED STATES PATENT OFFICE 2,346,015

THROTTLE CONTROLLING MECHANISM

Wilfred A. Eaton, Elyria, Ohio, assignor to Bendix-Westinghouse Automotive Air Brake Company, Elyria, Ohio, a corporation of Delaware Application October 27, 1941, Serial No. 416,718

8 Claims. (Cl. 137—139)

This invention relates to fluid pressure controlling apparatus and more particularly to a mechanism for remotely controlling the throttle valve of an internal combustion engine.

Various types of constructions have been heretofore proposed for remotely controlling the throttle of an internal combustion engine and such devices have been controlled in various manners, such as, for example, by complicated mechanical linkages, by hydraulic fluid lines or by compressed air lines. In cases where a source of compressed air is available on the vehicle, it is highly desirable to use such source of energy for operating various controls of the vehicle inluding the throttle valve. Among the problems presented in compressed air installations, however, is that of securing a sufficiently high compressor speed so as to secure a substantially rapid build-up of the pressure in the system when it is desired to move the vehicle after it has been standing for a sufficient time that the air in the system has been depleted. For example, if the vehicle has been stationary for a sufficient length of time so that there is substantially little air in the system, the engine must be operated at a sufficient speed to in turn operate the compressor to build up the pressure in the reservoir, and, since this pressure is utilized to operate the throttle, it will be readily observed that it is highly desirable to have some mechanism for opening the engine throttle to secure the desired engine speed under such conditions.

It is, accordingly, an object of the present invention to provide a throttle controlling system adapted to be operated by compressed air and so constituted as to solve the above problem.

Another object is to provide throttle controlling system adapted to be controlled by compressed air in such a manner that the engine speed may be increased beyond normal idling speed regardless of the fact that no compressed air is present in the system.

A further object is to provide a construction wherein the engine throttle is automatically advanced when the pressure in the compressed air system drops to a predetermined value.

Still another object is to provide a compressed air operated throttle controlling system which shall be positive and simple in construction and operation and which will automatically control the engine throttle to the end that the engine may be operated at a speed above idling speed to secure a quick build-up of pressure in the system prior to starting of the vehicle.

Other objects and novel features of the invention will appear more fully hereinafter from the following detailed description when taken in connection with the accompanying drawing illustrating one form of the invention. It is to be expressly understood, however, that the drawing is employed for purposes of illustration only and is not designed as a definition of the limits of the invention, reference being had for this latter purpose to the appended claims.

Referring to the drawing, the single figure therein illustrates the present invention in diagrammatic form, certain parts of which are shown in section. More particularly, an engine 1 having an intake manifold 2 is provided with a throttle valve 3 adapted to be controlled in its opening and closing movements by a fluid motor 4. While the throttle 3 is illustrated as being of the type adapted to be used in connection with an updraft carburetor (not shown), it is to be understood that this type of construction has been selected for purposes of illustration only and that the throttle valve is merely representative of all types of throttle valves which are adapted to be moved to open or closed position in order to control the speed of an internal combustion engine.

Means are provided for associating the fluid motor 4 with a source of compressed air and, as shown, such means include an engine driven compressor 5 adapted to supply compressed air to a reservoir 6 through conduit 7, a suitable type of unloading mechanism 8 being arranged to control the action of the compressor. Reservoir 6 is connected to the fluid motor 4 through conduits 9 and 10, a manually operable valve 11 of any suitable construction, such as that shown, for example, in Andres et al. Patent No. 2,133,275, granted October 18, 1938, being interposed between these last two named conduits in order to furnish a manually operable controlling mechnaism for graduating the flow of compressed air from the reservoir 6 to the fluid motor 4 and for controlling the exhaust of compressed air from the latter to atmosphere through an atmospheric connection 12 associated with the valve 11.

In order to interconnect the throttle valve 3 with the fluid motor 4, the former is provided with an operating shaft 13 to which a lever arm 14 is secured in any suitable manner. The latter is connected to a piston rod 15 through a pin and slot connection 16 associated with the free end of lever 14 and a rod 17 adjustably threadedly connected to the outer end of the piston rod. The latter extends into a cylinder 18 of the motor 4 and is provided on its inner end with a piston 19. Preferably, the piston rod 15 is hollow and filled with a suitable filtering material 20 in order to exclude dust from the interior of the cylinder as air passes into and from the cylinder through openings 21 and 22 in the side wall of the piston rod. Normally, the piston 19 is urged to the position shown as by means of a spring 23 and the construction is such that, with the parts occupying the position shown on the drawing, the throttle valve 3 is resiliently moved to its closed or normal idling position. It will be understood that this closed position is that normally referred to in the art as the closed throttle position and that the construction of the carburetor (not shown) is such that the engine will operate at its normal idling speed when the throttle valve is moved to the position referred to.

From the foregoing description, it will be readily understood that, if there is no pressure in the reservoir 6, the throttle valve will remain in closed position. In such event, if the operator desired to start the engine, it would be impossible to increase the speed of the engine beyond normal idling speed until the engine had operated the compressor 5 a sufficient length of time to build up enough pressure in reservoir 6 to move the piston 19 against the tension of the spring 23. Under such conditions, the engine may stall because of the inability to increase the opening of the throttle. If the engine did not stall, an appreciable amount of time would be consumed to build up the pressure in reservoir 6 to effect an opening of the throttle in order that the engine speed may be increased to in turn augment the rate of build-up of pressure so that the operator may proceed with the vehicle with a sufficient supply of compressed air to properly operate the various vehicle controls usually associated with a compressed air system, such as vehicle brakes, clutch, etc.

In order to overcome the above difficulties, the present invention provides a separate fluid controlled motor 24 associated with the fluid motor 4 in such a maner that, when the pressure of the compressed air in reservoir 6 is at or below a predetermined value, the piston 19 of the motor 4 will be positively moved to a throttle opening position. Preferably, the construction is such that, under the above circumstances, the throttle of the engine will be advanced to a position somewhat in excess of the normal idling position, such as, for example, to the dotted line position shown at 25. As shown, the fluid motor 24 includes a housing 26 sourrounding and secured in any suitable manner to one end of the cylinder 18, and adjustably threadedly associated with the open end of the housing 26 is a cylinder 27. A piston 28 is housed within the cylinder 27 and is normally urged toward the left, as viewed in the drawing, as by means of a spring 29. The piston 28 is provided with an extended portion 30 adapted to engage the inner end of the piston 19, and, in the event that there is no fluid pressure in the reservoir 6, the piston 23 is urged to the left to move the piston 15 in the same direction through contact between the extension 30 and piston 19, whereupon the throttle valve 3 will be moved to the advanced open position indicated at 25.

In order to limit the advance movement of the piston 28, the latter is provided with a radially extending shoulder 31 adapted to engage a cup-shaped member 32 clamped between a shoulder of the housing 26 and the inner end of cylinder 27. The member 32, in addition to providing a stop for limiting the movement of the piston 28, also provides an end seal for the fluid motor 4, it being pointed out that the extension 30 carries a suitable sealing ring 33 which cooperates with the inner periphery of the cup 32 as shown. Similar sealing rings 34 and 35 are carried by the cylinder 27 and are in fluid sealing engagement with the interior of the housing 26. A further sealing ring 36 is carried by the piston 28 and is adapted to bear against the interior of the cylinder 27.

Assuming that there is no pressure in the reservoir 6, it will be understood from the foregoing that the spring 29 urges the piston 28 to the left, as viewed in the figure, to a position where the shoulder 31 abuts the cup-shaped member 32. This will advance the piston 15 and move the throttle valve 3 to the advanced position shown at 25. Thus, when the engine is started, a fast idle condition will obtain and there will be little likelihood of the engine stalling. Moreover, the increased speed of the engine, beyond that which would be obtainable if the throttle were closed to the normal idling position, will operate the compressor 5 at such a rate of speed as to rapidly build up a supply of compressed air in the reservoir 6.

The present invention is so constructed and arranged that, upon a predetermined pressure being built up in the reservoir 6, the throttle advancing effect of the auxiliary fluid motor 24 of the fluid motor 4 is removed. For this purpose, the reservoir 6 is constantly in communication through conduit 37 with a chamber 38, the limits of which are defined by the sealing members 33 and 36. Thus, when the pressure in the reservoir 6 and in chamber 38 gradually builds up, the piston 28 will be gradually moved to the right, as viewed in the figure, compressing the spring 29 and permitting the throttle valve 3 to be gradually returned from its advance position 25 to its normally closed position through the action of spring 23 urging the piston 19 to the position shown on the drawing. Thus, as the pressure is being built up, the throttle advancing effect of the auxiliary motor 24 upon the motor 4 is gradually removed. If at any time, however, during operation of the vehicle, the pressure of the compressed air in reservoir 6 and chamber 38 should fall below the value determined by the setting of spring 29, it will be readily apparent that the latter will gradually move the piston 28 and piston 15 to the fast idle position as heretofore described.

By the present invention, there has thus been provided a compressed air throttle controlling mechanism which will automatically advance the throttle to a substantially open position irrespective of the fact that there is insufficient air in the system to secure throttle advance by manipulation of the manual control valve. The construction is compact, positively operable and comprises relatively few parts so that its incorporation in connection with remotely controlled engine throttle valves may be readily and easily effected.

While one embodiment of the invention has been illustrated and described herein with considerable particularity, it will be readily understood that the same is not limited to the form shown but is capable of a variety of expressions as will be readily understood by those skilled in the art without departing from the spirit of the invention. Reference will, therefore, be had to the appended claims for a definition of the limits of the invention.

What is claimed is:

1. In combination with an internal combustion engine having a throttle and a compressor driven by said engine, a compressed air reservoir connected with said compressor, means for controlling the opening and closing movements of the throttle comprising a fluid motor having a piston operatively connected with the throttle, resilient means normally urging said piston to throttle closing position, manually operable means interconnecting the reservoir and motor for graduating the flow of compressed air to and from the motor to control throttle opening and throttle closing operations thereof, and means subjected to reservoir pressure for positively moving said piston to effect a partial opening of the throttle upon a decrease in reservoir pressure to a predetermined amount.

2. A throttle controlling mechanism for an internal combustion engine throttle valve comprising a fluid motor having a piston connected with the throttle valve, a reservoir of compressed air, resilient means normally urging the piston to throttle closing position, a manually operable valve for controlling the application of compressed air from the reservoir to the motor to effect throttle opening movement of said piston, a second fluid motor having a piston resiliently urged to engage and move the first named piston to a partial throttle opening position, and means for subjecting the second named piston to reservoir pressure for moving the same out of engagement with the first named piston when the reservoir pressure reaches a predetermined amount.

3. A compressed air operated throttle valve mechanism comprising a fluid motor having a pressure responsive member movable to open and close a throttle valve, manually operable means for controlling the flow of compressed air to and from the motor, a second fluid motor having a pressure responsive element therein, means to subject the element to the pressure of a source of compressed air to move the element in one direction, and a spring for moving the element in the opposite direction to engage and move the member to a throttle opening position upon a decrease in the pressure of the air from said source to a predetermined value.

4. In combination with an internal combustion engine having a throttle controlled intake manifold and a source of compressed air, means for controlling the opening and closing movements of the throttle comprising a fluid motor operatively connected with said source, said motor comprising a cylinder having a piston connected to the throttle, a second motor having a cylinder connected with the first cyclinder, a piston in the second named cylinder and positioned in alignment with the first named piston, resilient means for moving the second piston into contact with the first piston to move both pistons to a throttle-advanced position, and means to connect the second cylinder and source whereby the pressure from the latter moves the second piston out of contact with the first piston.

5. In combination with an internal combustion engine having a throttle controlled intake manifold and a source of compressed air, means for controlling the opening and closing movements of the throttle comprising a fluid motor operatively connected with said source, said motor comprising a cylinder having a piston connected to the throttle, and means responsive to a drop in pressure to a predetermined amount for automatically moving said piston to a throttle-advanced position, said last named means having a cylinder arranged coaxially with the first named cylinder and a piston within the last cylinder arranged to contact and move the first named piston upon occurrence of said pressure drop.

6. In combination with an internal combustion engine heaving a throttle controlled intake manifold and a source of compressed air, means for controlling the opening and closing movement of the throttle comprising a fluid motor operatively connected with said source, said motor comprising a cylinder having a piston connected to the throttle, a second motor having a cylinder connected with the first cylinder, a piston in the second named cylinder and positioned in alignment with the first named piston, resilient means for moving the second piston into contact with the first piston to move both pistons to a throttle-advanced position, a cup-shaped member interposed between said cylinders and forming a stop for said second piston, and means connecting said source and said second cylinder for moving the second piston out of contact with the first piston when the pressure of the source is above a predetermined value.

7. A compressed air operated throttle valve control system having a throttle valve actuating mechanism including a pressure-responsive member movable to open and close a throttle valve and a second pressure-responsive member adapted for engagement with said first member and movable to open the throttle valve, means for subjecting said members to pressure from a source of compressed air for moving said first named member in one direction to open the throttle valve and for moving said second named member in the opposite direction, and means operable for moving said second named member in said one direction and into engagement with said first named member for moving the latter to open the throttle valve when the pressure to which said members are subjected decreases to a pressure below a predetermined value.

8. A compressed air operated throttle valve control system having a throttle valve actuating mechanism including a pressure-responsive member movable to open and close a throttle valve and a second pressure-responsive member adapted for engagement with said first member and movable to open the throttle valve, means for subjecting said members to pressure from a source of compressed air for moving said first named member in one direction to open the throttle valve and for moving said second named member in the opposite direction, and means operable for moving said second named member in said one direction and into engagement with said first named member for moving the latter to open the throttle valve when the pressure at said source decreases to a pressure below a predetermined value.

WILFRED A. EATON.